United States Patent
Davis et al.

(10) Patent No.: US 11,926,368 B2
(45) Date of Patent: Mar. 12, 2024

(54) CAB SUSPENSION SYSTEMS AND ASSOCIATED METHODS OF MANUFACTURE AND USE

(71) Applicant: Link Mfg., Ltd., Sioux Center, IA (US)

(72) Inventors: Tye B. Davis, Grand Meadow, MN (US); William E. Ott, Hawarden, IA (US)

(73) Assignee: Link Manufacturing, LTD, Sioux, IA (US)

( * ) Notice: Subject to any disclaimer, the term of this patent is extended or adjusted under 35 U.S.C. 154(b) by 0 days.

(21) Appl. No.: 17/727,648

(22) Filed: Apr. 22, 2022

(65) Prior Publication Data
US 2022/0242494 A1 Aug. 4, 2022

Related U.S. Application Data

(63) Continuation of application No. 16/742,751, filed on Jan. 14, 2020, now Pat. No. 11,338,865, which is a
(Continued)

(51) Int. Cl.
*B62D 33/06* (2006.01)
*B60G 17/015* (2006.01)
(Continued)

(52) U.S. Cl.
CPC ..... *B62D 33/0608* (2013.01); *B60G 17/0155* (2013.01); *B60G 17/016* (2013.01);
(Continued)

(58) Field of Classification Search
CPC ............ B62D 33/0608; B62D 33/0604; B60Y 2410/134; B60G 99/002; B60G 17/0155;
(Continued)

(56) References Cited

U.S. PATENT DOCUMENTS 1,713,515 A   5/1929   Bechereau
2,099,807 A   11/1937  Gregory
(Continued)

FOREIGN PATENT DOCUMENTS

CN    105799438 A      7/2016
DE    102010052151 A1  5/2012
(Continued)

OTHER PUBLICATIONS

Elahinia, Reducing Noise and Vibration of Hydraulic Hybrid and Plug-in Hybrid Electronic Vehicles, Phase I Final Report, The University of Toledo University Transportation Center and the U.S. Department of Transportation, Mar. 2009, 16 pages.
(Continued)

*Primary Examiner* — Amy R Weisberg
*Assistant Examiner* — Melissa Ann Bonifazi
(74) *Attorney, Agent, or Firm* — Perkins Coie LLP

(57) ABSTRACT

Vehicle cab suspension control systems are disclosed herein. In some embodiments, the cab suspension control systems can include front cab-to-frame mounts that include controllable elastomer-based isolators that can provide real time variable damping to improve ride quality and/or road holding and reduce cab roll in response to, for example, input from one or more cab and/or frame mounted accelerometers, position sensors, etc. Embodiments of the control systems described herein can utilize a single vehicle controller (e.g., an ECU) to control all of the cab suspension components (e.g., semi-active damping technologies, air spring technologies, etc.) employed on a vehicle to provide a single suspension control solution that can provide improved ride performance, road holding, etc.

18 Claims, 9 Drawing Sheets

Related U.S. Application Data continuation of application No. 15/852,182, filed on Dec. 22, 2017, now Pat. No. 10,569,813.

(60) Provisional application No. 62/438,906, filed on Dec. 23, 2016.

(51) Int. Cl.
| | | |
|---|---|---|
| *B60G 17/016* | (2006.01) | |
| *B60G 17/019* | (2006.01) | |
| *B60G 17/052* | (2006.01) | |
| *B60G 17/08* | (2006.01) | |
| *B60G 99/00* | (2010.01) | |

(52) U.S. Cl.
CPC . *B60G 17/01908* (2013.01); *B60G 17/01933* (2013.01); *B60G 17/052* (2013.01); *B60G 17/08* (2013.01); *B60G 99/002* (2013.01); *B62D 33/0604* (2013.01); *B60G 2204/162* (2013.01); *B60G 2300/026* (2013.01); *B60G 2400/0521* (2013.01); *B60G 2400/053* (2013.01); *B60G 2400/10* (2013.01); *B60G 2400/206* (2013.01); *B60G 2400/252* (2013.01); *B60G 2500/10* (2013.01); *B60G 2500/201* (2013.01); *B60G 2500/30* (2013.01); *B60G 2500/32* (2013.01); *B60G 2600/02* (2013.01); *B60G 2600/184* (2013.01); *B60G 2800/012* (2013.01); *B60Y 2410/134* (2013.01)

(58) Field of Classification Search
CPC ............ B60G 17/016; B60G 17/01908; B60G 17/01933; B60G 17/08; B60G 17/052; B60G 2204/162; B60G 2500/10; B60G 2400/10; B60G 2800/012; B60G 2600/02; B60G 2500/30; B60G 2300/026; B60G 2400/0521; B60G 2400/053; B60G 2400/206; B60G 2400/252; B60G 2500/201; B60G 2500/32; B60G 2600/184

See application file for complete search history.

(56) References Cited

U.S. PATENT DOCUMENTS

| | | | |
|---|---|---|---|
| 2,421,822 A | 6/1947 | Wood | |
| 2,427,427 A | 9/1947 | Tykeson | |
| 2,574,420 A | 11/1951 | Seddon | |
| 2,639,141 A | 5/1953 | Gabriel | |
| 2,705,634 A | 4/1955 | Sampson et al. | |
| 3,053,526 A | 9/1962 | Kendall | |
| 3,129,973 A | 4/1964 | Maruhn | |
| 3,393,005 A | 7/1968 | Herrmann et al. | |
| 3,508,784 A | 4/1970 | Small | |
| 3,847,492 A | 11/1974 | Kennicutt et al. | |
| 3,895,818 A | 7/1975 | Fearon | |
| 3,904,226 A | 9/1975 | Smalley | |
| 3,948,341 A | 4/1976 | Foster | |
| 4,382,604 A | 5/1983 | Nakagawa | |
| 4,390,187 A | 6/1983 | Maeda | |
| 4,438,970 A | 3/1984 | Boucher | |
| 4,862,983 A | 9/1989 | Kreft | |
| 4,871,189 A | 10/1989 | Van Breemen | |
| 4,934,667 A | 6/1990 | Pees et al. | |
| 5,060,919 A | 10/1991 | Takano et al. | |
| 5,189,621 A | 2/1993 | Onari et al. | |
| 5,273,308 A | 12/1993 | Griffiths | |
| 5,335,695 A | 8/1994 | Pierce | |
| 5,344,189 A | 9/1994 | Tanaka et al. | |
| 5,375,823 A | 12/1994 | Navas | |
| 5,390,121 A | 2/1995 | Wolfe | |
| 5,403,031 A | 4/1995 | Gottschalk et al. | |
| 5,433,423 A | 7/1995 | Whightsil | |
| 5,448,976 A | 9/1995 | Treinies et al. | |
| 5,452,919 A | 9/1995 | Hoyle et al. | |
| 5,466,007 A | 11/1995 | Smith | |
| 5,553,911 A | 9/1996 | Bodin et al. | |
| 5,759,133 A | 6/1998 | Treinies et al. | |
| 5,779,009 A | 7/1998 | Iwasaki | |
| 5,785,345 A | 7/1998 | Barlas et al. | |
| 5,814,999 A | 9/1998 | Elie et al. | |
| 5,816,587 A | 10/1998 | Stewart et al. | |
| 5,955,674 A | 9/1999 | McGovern et al. | |
| 5,967,597 A | 10/1999 | Kooi et al. | |
| 5,994,859 A | 11/1999 | Deng et al. | |
| 6,070,681 A * | 6/2000 | Catanzarite | B62D 33/0608 180/89.15 |
| 6,072,297 A | 6/2000 | Xu et al. | |
| 6,073,714 A | 6/2000 | McHorse et al. | |
| 6,109,381 A | 8/2000 | Stuyvenberg et al. | |
| 6,128,959 A | 10/2000 | McGovern et al. | |
| 6,138,629 A | 10/2000 | Masberg et al. | |
| 6,168,229 B1 | 1/2001 | Kooi et al. | |
| 6,206,121 B1 | 3/2001 | Michel | |
| 6,311,993 B1 | 11/2001 | Hulstein et al. | |
| 6,397,985 B2 | 6/2002 | Wiebe | |
| 6,431,557 B1 | 8/2002 | Terborn et al. | |
| 6,443,437 B1 | 9/2002 | Beyene et al. | |
| 6,471,198 B2 | 10/2002 | Herbst | |
| 6,502,837 B1 | 1/2003 | Hamilton et al. | |
| 6,540,038 B2 | 4/2003 | Taylor et al. | |
| 6,573,659 B2 | 6/2003 | Toma et al. | |
| 6,644,632 B1 | 11/2003 | Jaberg | |
| 6,732,033 B2 * | 5/2004 | LaPlante | B60G 17/08 280/5.515 |
| 6,758,294 B2 | 7/2004 | Peddycord et al. | |
| 6,758,648 B1 | 7/2004 | Eekhoff et al. | |
| 6,832,143 B2 | 12/2004 | Trudeau et al. | |
| 6,834,873 B1 | 12/2004 | Vander Kooi et al. | |
| 6,845,989 B2 | 1/2005 | Fulton et al. | |
| 6,880,839 B2 | 4/2005 | Keeler et al. | |
| 6,904,344 B2 | 6/2005 | LaPlante et al. | |
| 6,932,401 B2 | 8/2005 | Eekhoff et al. | |
| 7,014,237 B1 | 3/2006 | Eekhoff et al. | |
| 7,066,474 B2 | 6/2006 | Hiebert et al. | |
| 7,070,157 B2 | 7/2006 | Huprikar et al. | |
| 7,086,507 B2 | 8/2006 | Hitchcock et al. | |
| 7,140,669 B2 | 11/2006 | Bollinger et al. | |
| 7,216,925 B1 | 5/2007 | Abele et al. | |
| 7,234,713 B1 | 6/2007 | Vander Kooi et al. | |
| 7,261,304 B2 | 8/2007 | Trudeau et al. | |
| 7,331,627 B2 | 2/2008 | Van Den Brink et al. | |
| 7,389,994 B2 | 6/2008 | Trudeau et al. | |
| 7,416,190 B2 | 8/2008 | Sandbulte | |
| 7,503,586 B2 | 3/2009 | Ramsey | |
| 7,530,577 B2 | 5/2009 | Sandbulte | |
| 7,735,516 B2 | 6/2010 | Morris | |
| 7,789,405 B2 | 9/2010 | Lie | |
| 7,887,065 B2 | 2/2011 | Trudeau et al. | |
| 7,966,685 B2 | 6/2011 | Van Beek et al. | |
| 8,192,106 B2 | 6/2012 | Vogler et al. | |
| 8,302,988 B2 | 11/2012 | Noble | |
| 8,413,997 B1 | 4/2013 | Coombs et al. | |
| 8,473,157 B2 | 6/2013 | Savaresi et al. | |
| D727,219 S | 4/2015 | Winter et al. | |
| 9,139,061 B2 | 9/2015 | Delorenzis | |
| 9,157,529 B2 | 10/2015 | Westnedge et al. | |
| 9,283,993 B2 | 3/2016 | Rager et al. | |
| 9,290,221 B2 | 3/2016 | Conaway et al. | |
| 9,315,222 B1 | 4/2016 | Wetter et al. | |
| 9,340,242 B1 | 5/2016 | Hartmann et al. | |
| 9,352,628 B2 | 5/2016 | Barton et al. | |
| 9,358,854 B1 | 6/2016 | Sandbulte et al. | |
| 9,481,416 B2 | 11/2016 | Conaway et al. | |
| 9,581,214 B2 | 2/2017 | Sun et al. | |
| 9,688,318 B1 | 6/2017 | Wetter et al. | |
| 9,829,060 B2 | 11/2017 | Batsch et al. | |
| 9,937,766 B1 | 4/2018 | Bobb et al. | |
| 10,543,730 B2 | 1/2020 | Davis et al. | |
| 10,569,813 B2 | 2/2020 | Davis et al. | |
| 10,569,814 B2 | 2/2020 | Hulstein et al. | |
| D897,911 S | 10/2020 | Winter et al. | |

(56) References Cited

U.S. PATENT DOCUMENTS

| | | |
|---|---|---|
| D897,921 S | 10/2020 | Winter et al. |
| 10,967,927 B2 | 4/2021 | Jacobsma et al. |
| 11,338,865 B2 | 5/2022 | Davis et al. |
| 11,485,435 B2 | 11/2022 | Jacobsma et al. |
| 2001/0007419 A1 | 7/2001 | Tanaka |
| 2003/0111810 A1 | 6/2003 | Fulton et al. |
| 2003/0151222 A1 | 8/2003 | Sutton et al. |
| 2003/0193149 A1 | 10/2003 | Russell et al. |
| 2005/0236792 A1 | 10/2005 | Hedenberg |
| 2008/0184623 A1 | 8/2008 | Heigl et al. |
| 2008/0185549 A1 | 8/2008 | Steinnbuchel et al. |
| 2009/0085377 A1 | 4/2009 | Hayes et al. |
| 2009/0200718 A1 | 8/2009 | Roemer et al. |
| 2010/0283581 A1 | 11/2010 | Heigl |
| 2011/0035104 A1 | 2/2011 | Smith |
| 2011/0266727 A1 | 11/2011 | Knevels |
| 2015/0137463 A1 | 5/2015 | McLennan et al. |
| 2015/0344083 A1 | 12/2015 | Safiejko |
| 2017/0225729 A1 | 8/2017 | Yakimishyn |
| 2019/0061847 A1 | 2/2019 | Barton et al. |
| 2019/0077468 A1 | 3/2019 | Hulstein et al. |
| 2020/0255069 A1 | 8/2020 | Davis et al. |
| 2022/0242494 A1 | 8/2022 | Davis et al. |
| 2023/0010068 A1 | 1/2023 | Davis et al. |

FOREIGN PATENT DOCUMENTS

| | | |
|---|---|---|
| DE | 102011120428 A1 | 6/2012 |
| EP | 0867315 A2 | 9/1998 |
| WO | 2006071172 A1 | 7/2006 |
| WO | 2006093458 A1 | 9/2006 |
| WO | 2009144174 A1 | 12/2009 |
| WO | 2009150508 A1 | 12/2009 |

OTHER PUBLICATIONS

Communication/Examination Report dated Jan. 20, 2020 for European Patent Application No. 17210324.4, six pages.

European Search Report dated May 22, 2018; European Patent Application No. 17210324.4; 12 pages.

Li et al., "A State-of-the-Art Review on Magnetorheological Elastomer Devices," University of Wollongong, 2014, 38 pages.

European Patent Office Extended European Search Report dated Oct. 14, 2021 for European patent application No. 21184326.3, 11 pages.

European Office Action dated Aug. 4, 2022 for European patent application No. 21184326.3, 8 pages.

European Office Action dated Jun. 29, 2023 for European patent application No. 21184326.3, 6 pages.

Link Manufacturing Ltd., Air Control Kit (1350-1004), Installation Instructions Parts List; Jan. 14, 2016, 4 pages.

Savaresi et al., "Semi-Active Suspension Control Design for Vehicles", Chapter 1, 42 pages, 2010.

Yu et al., "Thermal effects on the laminated magnetorheological elastomer isolator", Smart Mater. Struct., vol. 25, 115039, pp. 1-13, 2016.

* cited by examiner

CAB SUSPENSION SYSTEMS AND ASSOCIATED METHODS OF MANUFACTURE AND USE

CROSS-REFERENCE TO RELATED APPLICATION

The present application is a continuation of U.S. patent application Ser. No. 16/742,751, filed Jan. 14, 2020, now allowed, which is a continuation of U.S. patent application Ser. No. 15/852,182, filed Dec. 22, 2017, now U.S. Pat. No. 10,569,813, issued Feb. 25, 2020, which claims the benefit of and priority to U.S. Provisional Patent Application No. 62/438,906, filed Dec. 23, 2016, and titled "CAB SUSPENSION SYSTEMS AND ASSOCIATED METHODS OF MANUFACTURE AND USE", the disclosure all of which are incorporated herein by reference in their entirety.

TECHNICAL FIELD

The following disclosure relates generally to the field of vehicle suspension systems and, more particularly, to semi-active suspension systems for vehicle cabs.

BACKGROUND

Various types of suspension systems for heavy duty trucks, trailers, buses, automobiles and other vehicles are known, and these include: passive systems, active systems, semi-active systems and adaptive systems. The suspension variables in a passive suspension system do not change over time (except through wear), and as a result suspension movement is determined entirely by the road surface and other external factors. In active suspension systems, actuators can exert an independent force on the suspension to improve the ride characteristics. Both semi-active and adaptive suspension systems can vary a property of the suspension, usually damping, to rapidly achieve a better ride, better road-holding, or a combination of the two. Semi-active suspension systems differ from adaptive suspension systems, however, in that the characteristics of the suspension change more rapidly in a semi-active suspension system.

Semi-active suspension systems differ from active suspension systems in that less energy is used in semi-active suspension systems and, in contrast to active suspension systems, no direct force is applied to the suspension system via power input from a control system. Instead, a small amount of energy is used to change the characteristic (e.g., damping) of the suspension system by, for example, electronically varying the size of an orifice through which damping fluid passes. By way of example, in the event the vehicle experiences a shock, a semi-active suspension system can only operate to dissipate the energy from the shock and not to apply an independent force in the same direction as the suspension motion resulting from the shock. Accordingly, semi-active suspension systems use less energy and are thus less costly than active suspension systems, yet they can still provide ride benefits beyond what can be achieved with a passive or adaptive suspension system.

Vehicle height control systems are also well known. A common height control system includes a mechanically actuated height control valve (e.g., a rotary valve) that controls the flow of pressurized air to and from one or more suspension air springs based on suspension motion. Operation of the height control valve can allow air to flow into the air spring to increase the height, or flow out of the air spring to reduce the height, in response to both dynamic events as well as changes in static load on the suspension. Some vehicles include electronic height control systems that operate one or more valves based on input from one or more height sensors. In such systems, dynamic events can be ignored so that the system only adjusts suspension height in response to changes in static load that affect the ride height. This has the benefit of considerably reducing air consumption by the height control system, and thereby improving fuel economy.

Various types of cab mounting suspension systems are known. In one of the most common types used in the United States, the two front corners of the cab are mounted to the vehicle frame with passive rubber isolators, and the rear of the cab is mounted to the frame with either one or two air springs and corresponding shock absorbers. Another common configuration uses rubber isolators at each of the front and rear corners of the cab, or alternatively, rubber isolators at the two front corners and a single rubber isolator at the rear of the cab. Other configurations use air springs or air springs and shock absorber combinations at each of the four corners of the cab.

Many of the suspension control systems available today only address one aspect of vehicle suspension (e.g., damping, ride height, etc.). Additionally, different suspension technologies can be used at the front and rear of the cab, and often each of the technologies is provided by a different manufacturer that provides a particular controller and control solution that is unique to their individual components. These factors prohibit combining multiple technologies in a cost-effective manner to provide a complete cab suspension solution that offers superior performance.

DETAILED DESCRIPTION

Figure 1A:
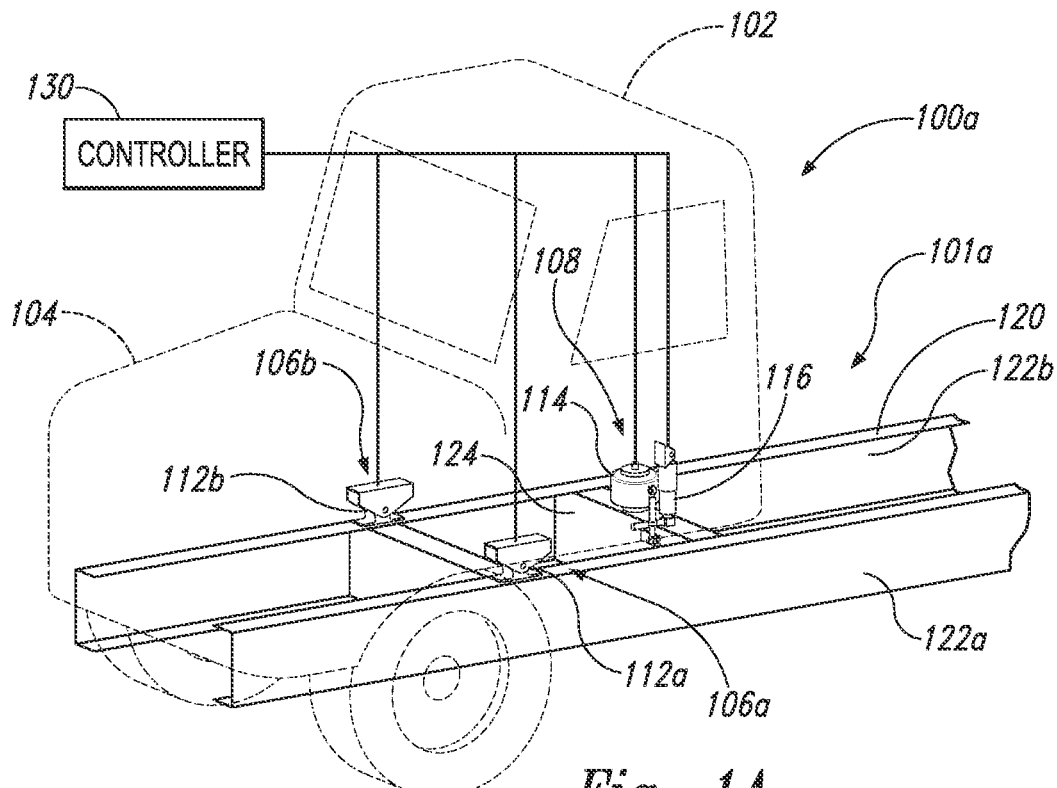
FIGS. 1A and 1B are partially schematic front isometric views of vehicles having semi-active suspension control systems configured in accordance with embodiments of the present technology.

The following disclosure describes various embodiments of vehicle cab suspension systems and, in particular, semi-active cab suspension control systems and associated components. As used herein, "cab" generally refers to the portion of the vehicle (e.g., a heavy duty truck) in which the operator sits. In some embodiments, the cab suspension control systems described herein include mounting components at each of the cab mount locations that are controlled by a single controller (e.g. the vehicle Electronic Control Unit (ECU)). The systems described herein can be configured to accommodate various vehicle platforms, but each can include one or more of the following: air springs, shock absorbers, isolators, etc., which can be controlled to provide variable damping force, position (height), stiffness, etc. As described in further detail below, in some embodiments the systems can receive motion and positional information from various sensors (e.g., accelerometers, height sensors, pressure sensors, etc.) mounted to the cab and/or the vehicle frame, and/or from the vehicle Controller Area Network (CAN). In operation, the controller executes one or more algorithms to determine the optimum (or at least a more optimum) operating parameter for each of the control variables of the controlled suspension components, and then provides the appropriate control signals to the suspension components to achieve the desired performance.

Certain details are set forth in the following description and in FIGS. 1-12 to provide a thorough understanding of various embodiments of the present technology. In other instances, well-known structures, methods, systems, materials and/or operations often associated with trucks and other on or off road vehicles, vehicle suspension systems, control systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

For ease of reference, identical reference numbers in the Figures identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
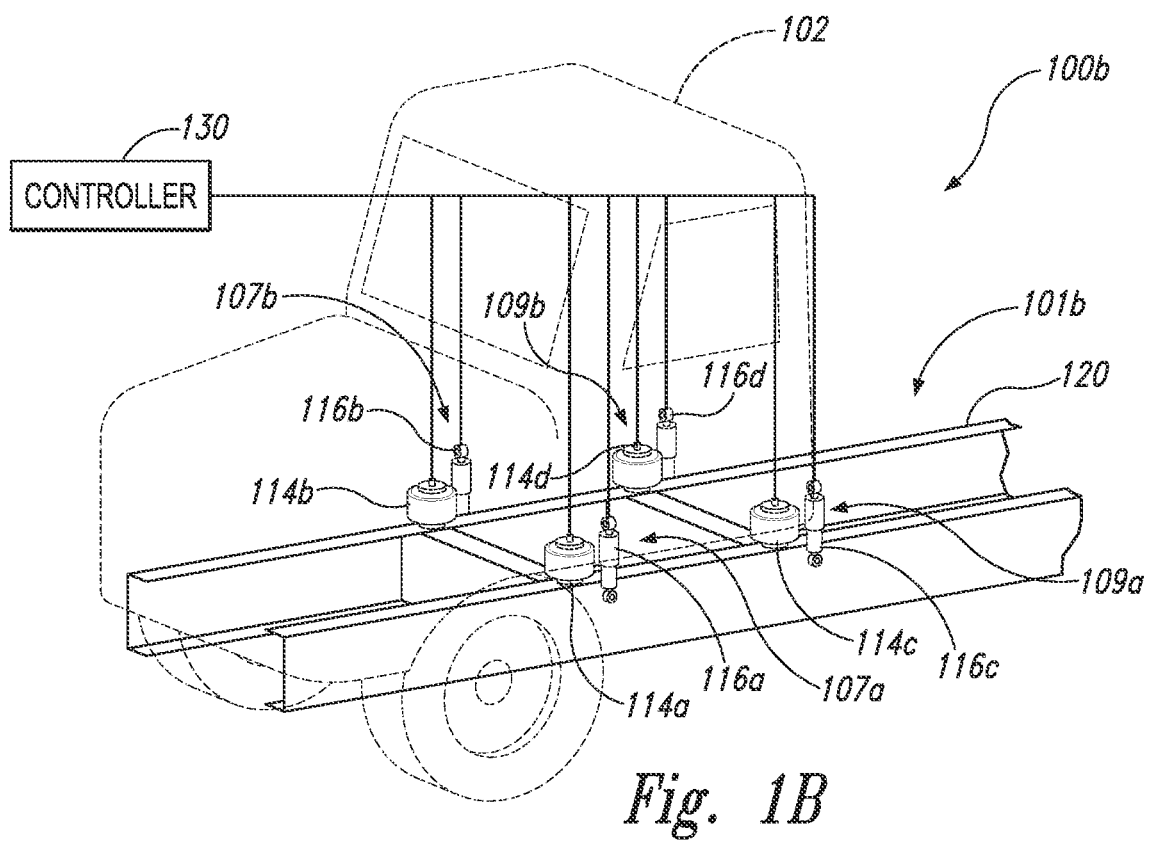

FIG. 1A is a partially schematic front isometric view of a vehicle 100a having a cab 102 mounted to a chassis 120 with a cab suspension control system 101a configured in accordance with an embodiment of the present technology. FIG. 1B is a similar view of a vehicle 100b in which the cab 102 is mounted to the chassis 120 with a cab suspension control system 101b configured in accordance with another embodiment of the present technology. Referring first to FIG. 1A, in the illustrated embodiment, the chassis 120 includes a rear cross-member 124 extending between a left (e.g., driver side) frame rail 122a and a right (e.g., passenger side) frame rail 122b. In the illustrated embodiment, the frame rails 122a, b extend longitudinally and generally parallel to the longitudinal axis of the vehicle 100a. The cab 102 is mounted to the left frame rail 122a at a left front mount location 106a, and to the right frame rail 122b at a right front mount location 106b. The aft portion of the cab 102 is mounted to the rear cross-member 124 at a rear mount location 108. The vehicle 100a includes an engine compartment at least partially enclosed by a hood 104 that is independently mounted to the chassis 120 forward of the cab 102.

In the illustrated embodiment, the suspension control system 101a includes isolators 112, such as semi-active elastomeric (e.g., rubber-based) isolators (identified individually as a left isolator 112a and a right isolator 112b) at each of the two front mount locations 106a, b. Additionally, the suspension control system 101a further includes a semi-active shock absorber 116 and an air spring 114 at the rear mount location 108. Although not shown in FIG. 1A, the rear mount location 108 can also include a displacement or position sensor mounted between the cab 102 and the chassis 120 in conjunction with the air spring 114 and the shock absorber 116. In one aspect of this embodiment, each of the suspension components described above (e.g., the isolators 112, the air spring 114 and the shock absorber 116) can be operably connected to a controller 130 (e.g., a vehicle ECU). As described in further detail below, the controller 130 is configured to receive dynamic (e.g., accelerometer) information and/or positional information from sensors mounted to the cab 102 and/or the chassis 120 proximate the front mount locations 106a, b, the rear mount location 108, and/or other locations on the vehicle 100a, and respond by providing control signals to the appropriate suspension components to adjust a suspension property (e.g., damping) and achieve better ride quality and/or road holding. The sensors can be dedicated sensors for use solely with the suspension control system 101a, or they be vehicle sensors that were originally provided with the vehicle by the manufacturer and accessed via the vehicle's Controller Area Network (CAN) system.

Turning next to FIG. 1B, in this embodiment the cab 102 is mounted to the frame rails 122a, b by means of an air spring 114 (identified individually as air springs 114a-d) and a corresponding shock absorber 116 (identified individually as shock absorbers 116a-d) at each of a left front mount location 107a, a right front mount location 107b, a left rear mount location 109a, and a right rear mount location 109b. Although not shown in FIG. 1B, each of the mount locations 107a, b and 109a, b can additionally include a displacement sensor in conjunction with the air spring 114 and shock absorber 116. As with the cab suspension control system 101a described above, the cab suspension control system 101b includes the controller 130 which is operably connected to each of the air springs 114 and shock absorbers 116 at the four cab mount locations.

The cab mount configuration illustrated in FIG. 1A (which employs the isolators 112a, b at the front mount locations 106a, b) may be most suitable for use with conventional truck or tractor cabs in which clearance between the cab 102 and the hood 104 (FIG. 1A) is a primary concern. One reason for this is that the annular bodies or bushings 232 (FIG. 2) of the isolators 112 can restrict forward and aft motion of the cab, thereby limiting relative displacement between the cab 102 and the hood 104. In other instances, the cab mount configuration illustrated in FIG. 1B may be most suitable for non-conventional trucks or tractors (e.g., trucks or tractors having a cab-over configuration.)

In operation, the controller 130 receives input (e.g., acceleration information, displacement information, etc.) from one or more sensors at or near the cab mount locations, and executes instructions stored on computer readable medium to determine the optimum (or at least a more favorable) operational state of the controllable suspension components at each mount location in accordance with one or more of the flow routines described below. The controller 130 then outputs a command signal to each of the suspension components to adjust the operating parameter of the component (e.g., the damping, height, etc.) to achieve the optimum (or at least more favorable) setting.

Figure 2:
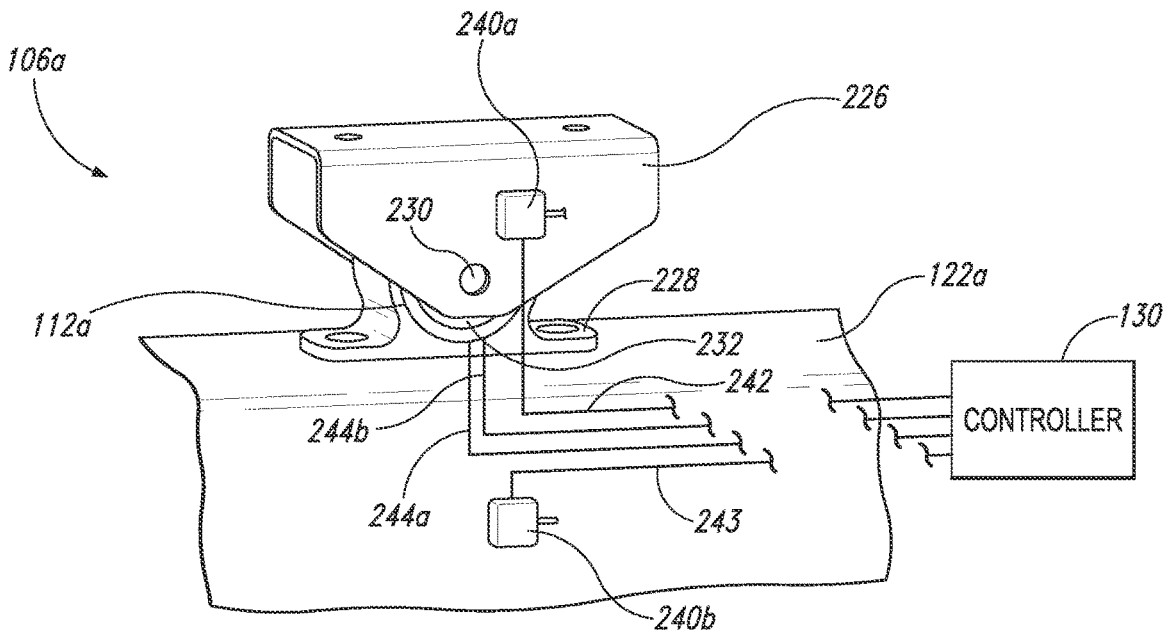
FIG. 2 is an enlarged, partially schematic isometric view of a cab front mount location having a semi-active isolator configured in accordance with an embodiment of the present technology.

FIG. 2 is an enlarged, partially schematic isometric view of the left front mount location 106a configured in accordance with an embodiment of the present technology. The following discussion describing the left front mount location 106a applies equally to the right front mount location 106b (FIG. 1A). In the illustrated embodiment, the isolator 112a includes a cylindrical or annular body 232 (which can also be referred to as a bushing 232) supported in a rigid base 228. The base 228 can be fixedly attached to an upper surface of the left frame rail 122a with one or more bolts or other suitable attachment mechanisms well known in the art. The annular body 232 includes a central concentric bore or aperture configured to receive a shaft 230 (e.g., a bolt, pin, etc.) that pivotally couples a bracket 226 to the isolator 112a. The pivotal attachment of the bracket 226 to the isolator 112a enables the cab 102 to rotate about the shaft 230 as, for example, the rear portion of the cab 102 is raised or lowered by operation of the air spring 114. Although not depicted in FIG. 2, the left front corner portion of cab 102 (FIG. 1A) can be fixedly attached to an upper portion of the bracket 226 by one or more bolts or other suitable attachment mechanisms to mount the left front corner of the cab 102 to the left frame rail 122a.

In the illustrated embodiment, one or more sensors can be operably mounted to the bracket 226 and/or the frame rail 122a to obtain dynamic and positional information relative to the cab 102 and the chassis 120. For example, in the illustrated embodiment a first sensor, such as an accelerometer 240a, is fixedly attached to the bracket 226, and a second sensor, such as accelerometer 240b, is fixedly attached to the frame rail 122a. In some embodiments, the accelerometers 240a,b can be accelerometers configured and positioned to sense linear accelerations of the cab 102 and the frame rail 122a, respectively, along a vertical axis relative to the road surface. Suitable accelerometers can include, for example, the Continental BSZ 04 accelerometer available from Continental AG, Vahrenwalder Str. 9, D-30001 Hanover, Germany. The first accelerometer 240a can be electrically and/or communicatively connected to the controller 130 (FIG. 1A) via a first electrical lead or link 242 (e.g., one or more wires), and the second accelerometer 240b can be electrically and/or communicatively connected to the controller 130 via a second electrical link 243 (e.g., one or more wires). In some embodiments, the accelerometers 240a, b can be provided specifically as part of the cab suspension control system 101a. In other embodiments, one or both of the accelerometers 240a, b may be those that are already included on the vehicle and their signal input can be received by the controller 130 via the vehicle CAN system. Although the sensors 240a, b of the illustrated embodiment are accelerometers, in other embodiments other types of sensors, including, angular acceleration sensors, angle sensors, current sensors, pressure sensors, strain gauges, etc. can be used to assess and evaluate movement of the cab 102 relative to, e.g., the chassis 120.

As noted above, in some embodiments the isolator 112a can be an elastomeric semi-active isolator. For example, in some embodiments the annular body 232 can be formed from an elastomer (e.g., rubber, polybutadienes, polyisobutylenes, polyurethanes, etc.) of suitable hardness, and have relatively thick walls that enclose one or more internal chambers that are at least partially filled with a magneto-rheological (MR) fluid. As is known, in MR fluid-based semi-active suspension systems, the MR fluid is composed of oil and varying percentages of ferrous particles (e.g., 20-50 microns in diameter) that have been coated with an anticoagulant material. Varying the magnetic field strength with an electromagnetic coil has the effect of changing the viscosity of the magneto-rheological fluid. In these embodiments, the damping provided by the isolator 112a can be altered by subjecting the MR fluid to a magnetic field by applying electrical current to an electromagnet (not shown in FIG. 2) positioned proximate the fluid by means of the controller 130. Application of the magnetic field alters the viscous properties of the MR fluid, which in turn changes the damping characteristics of the isolator 112a. More specifically, increasing the viscosity increases damping, while reducing viscosity reduces damping. Construction and operation of MR fluid-filled suspension devices are described in, for example, U.S. Pat. No. 6,070,681, and the publication titled "Reducing Noise and Vibration of Hydraulic Hybrid and Plug-in Hybrid Electric Vehicles," Elahinia, 2012, both of which are incorporated herein by reference in their entireties. In other embodiments, instead of using an MR fluid-filled isolator, the annular body 232 of the isolator 112a can include multiple internal chambers filled with conventional isolator fluid, and the opening size of an orifice positioned between adjacent chambers can be electronically controlled by the controller 130 to vary the damping provided by the isolator 112a.

In a further embodiment, rather than being filed with an MR fluid, the annular body 232 can be formed from an MR elastomer or similar material that changes stiffness and damping properties in response to a magnetic field controlled by the controller 130. A description of various MR elastomer devices can be found in the publication titled "A State-of-the-Art Review on Magnetorheological Elastomer Devices," Yancheng Li et. al, 2014, which is incorporated herein by reference in its entirety. In either of the MR fluid or MR elastomer embodiments, there would be at least two electrical leads 244a, b (e.g., wires) completing a circuit from a power source controlled by the controller 130 to a coil positioned within or at least proximate the annular body 232. Current supplied to the coil via the circuit generates a magnetic field that changes the damping properties of the isolator 112a via either the MR fluid or the MR elastomer. In other embodiments, the annular body 232 can be formed from an electrorheological elastomer that similarly changes damping properties in response to an electric field activated by the controller 130 via the leads 244a, b. Although the foregoing discussion describes various types of semi-active isolators, embodiments of the present disclosure are not limited to use with any particular type of isolator unless specifically noted, and accordingly the embodiments can include other types of isolators (e.g., other semi-active isolators) without departing from the present disclosure.

Figure 3:
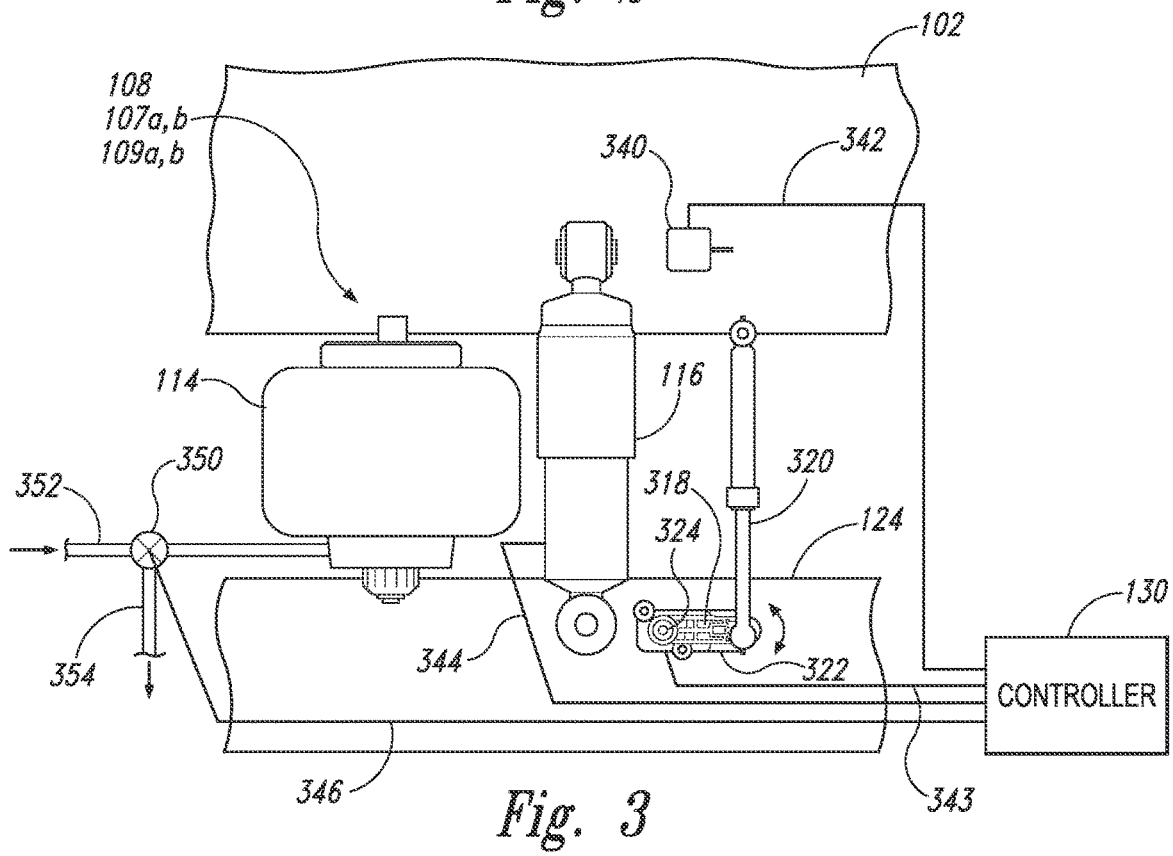
FIG. 3 is a partially schematic front view of a cab rear mount location having an arrangement of suspension components configured in accordance with an embodiment of the present technology.
Figure 4:
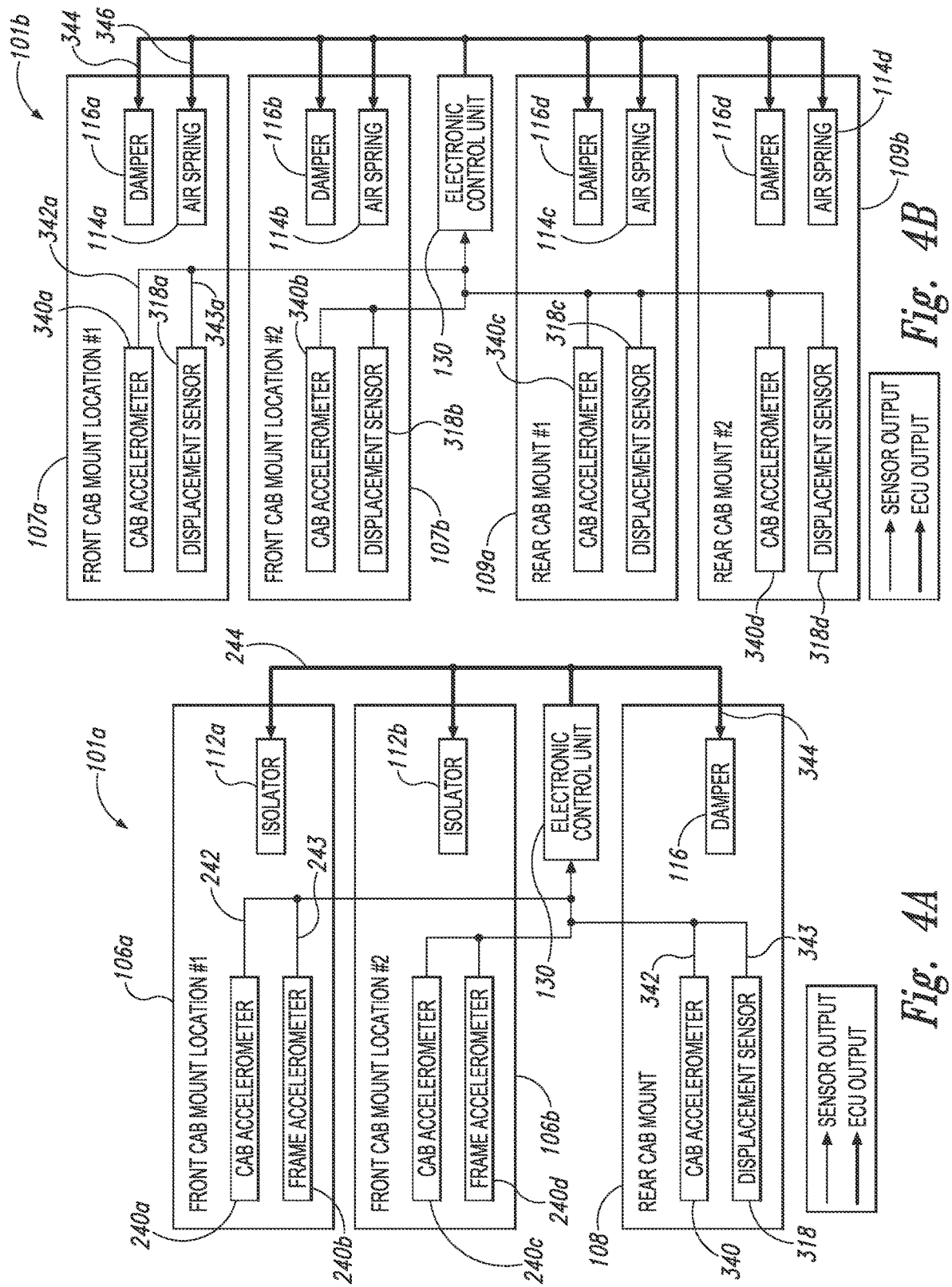
FIGS. 4A and 4B are block diagrams of two cab suspension system layouts configured in accordance with embodiments of the present technology.

FIG. 3 is an enlarged, partially schematic front view of the rear cab mount location 108 shown in FIG. 1A, configured in accordance with an embodiment of the present technology. Although FIG. 3 depicts the suspension component arrangement at the rear mount location 108, the same arrangement of components (or at least a generally similar arrangement of components) also exists at each of the four cab mount locations shown in FIG. 1B. More specifically, as noted above each of the four corners of the cab 102 in FIG. 1B is supported by an air spring 114 and a shock absorber 116, and thus the description of FIG. 3 that follows applies to the rear mount location 108 of FIG. 1A as well as the four corner mount locations 107a, b and 109a, b of FIG. 1B.

In the illustrated embodiment, the air spring 114 has a lower end portion fixedly attached to the frame cross-member 124, and an upper end portion fixedly attached to a lower portion of the cab 102. The control of pressurized gas (e.g., air) into and out of the air spring 114 is controlled by an electrically actuated valve 350 that is in fluid communication with a fill conduit 352 and an exhaust conduit 354. The fill conduit 352 is operably coupled in fluid communication to a high pressure gas source. The valve 350 can be moved between "closed," "fill" and "exhaust" positions in response to electrical commands from the controller 130 (FIG. 1A) via an electrical link 346 (e.g., one or more wires).

In the illustrated embodiment, the semi-active shock absorber 116 includes a first or lower end portion fixedly attached to the rear cross-member 124 in a conventional manner, and an upper end portion fixedly attached to a lower portion of the cab 102 in a similarly conventional manner. The semi-active shock absorber 116 can be any type of semi-active electrically actuated shock absorber known to those of ordinary skill in the art. For example, in some embodiments, the semi-active shock absorber 116 can be a telescoping MR fluid-filled device in which the damping is varied by application of a magnetic field to the MR fluid. More specifically, in the illustrated embodiment, the shock absorber 116 can include an internal coil that receives control current from the controller 130 via an electrical link 344 (e.g., two wires). In other embodiments, the shock absorber 116 can include MR or ER elastomers that provide varied damping via a change in a magnetic or electric field, respectively. In yet other embodiments, the shock absorber 116 can include an adjustable orifice through which the shock absorber fluid passes and which can be electrically controlled to vary the orifice size and change the damping properties in response to a control signal from the controller 130. Various examples of semi-active shock absorbers and associated systems that can be included in the systems described herein are described in U.S. Pat. Nos. 6,070,681, 6,904,344, and 6,732,033, each of which is incorporated herein in its entirety by reference.

As noted above, various types of sensors can be used to obtain information regarding the acceleration, speed, and/or displacement of the cab 102 relative to, for example, the chassis 120. For example, in the illustrated embodiment an accelerometer 340 is mounted to a lower portion of the cab 102 proximate the shock absorber 116, and is electrically connected to the controller 130 via an electrical link 342 (e.g., one or more wires). Although an accelerometer could also be mounted to the cross-member 124 to obtain acceleration information relating to the chassis 120, in the illustrated embodiment a displacement or position sensor 318 is operably coupled between the cross-member 124 and the cab 102. More specifically, in this embodiment the position sensor 318 includes a link 320 having an upper end portion pivotally attached to a lower portion of the cab 102, and an opposite lower end portion pivotally coupled to a distal end portion of a pivotable arm 322. The arm 322 is pivotally attached to the cross-member 124 via a pivot 324. In operation, up or down movement of the cab 102 relative to the cross-member 124 causes the link 320 to pivot the arm 322 upwardly and downwardly about the pivot 324. The position sensor 318 includes a sensing device that senses the angular movement of the arm 322 relative to the pivot 324, which can be calibrated to provide the vertical displacement of the cab 102 relative to the cross-member 124. One type of suitable position sensor is the Continental Chassis Position Sensor (CPS) available from Continental AG, Vahrenwalder Str. 9, D-30001 Hanover, Germany. However, any suitable position or displacement sensor known in the art can be used with the systems described herein. The displacement information from the position sensor 318 is provided to the controller 130 via an electrical link 343 (e.g., one or more wires).

As described in greater detail below, the components described above with reference to FIG. 3 can be implemented in various ways to semi-actively control the damping (or damping coefficient) at the respective cab mount locations, the ride height, and/or the extent of lateral roll of the cab 102. For example, the ride height can be increased via a command signal from the controller 130 that opens the valve 350 and introduces high pressure gas into the air spring 114. Similarly, the ride height can be reduced by a corresponding command signal that moves the valve 350 to the exhaust position allowing air to flow out of the air spring 114 via the exhaust conduit 354. Additionally, vibration and other relative motion between the cab 102 and the chassis 120 can be controlled in real-time via command signals sent from the controller 130 to the shock absorber 116 to control, for example, the viscosity of the MR fluid (in the case of an MR fluid-filled shock absorber), and/or to vary a fluid orifice size (in the case of a shock absorber having variable orifice damping). As described in greater detail below, the controller 130 can provide the command signals to the air spring 114 and/or the shock absorber 116 in response to and based on, for example, acceleration information from the accelerometer 340 and/or the displacement information from the position sensor 318.

FIGS. 4A and 4B are block diagrams of the cab suspension control systems 101a and 101b, respectively, configured in accordance with embodiments of the present technology. Referring first to FIG. 4A, in the suspension control system 101a the controller 130 receives input from the sensors at the front cab mount locations 106a, b and the rear mount location 108, and based on this input, outputs command signals to one or more of the controllable suspension components at the respective cab mount locations. More specifically, in the illustrated embodiment of FIG. 4A, the controller 130 receives accelerometer output from the cab and frame accelerometers 240a-d at the front mount locations 106a, b, and output from the cab accelerometer 340 and the position sensor 318 at the rear cab mount location 108. The controller 130 processes the output from the sensors by executing non-transitory instructions stored on computer-readable media to determine appropriate command signals to output to the controllable suspension components (e.g., the isolators 112 and the damper 116) in real-time at the front mount locations 106 and the rear mount location 108 to achieve an improved or desired ride quality. As used herein, improving ride quality can include reducing the vibration and shocks from road conditions, reducing body roll and pitch variation in driving situations such as cornering, accelerating and breaking, and/or improving road-holding. The foregoing are but some examples of the type of improved ride conditions that the systems described herein can achieve.

Turning next to FIG. 4B, in the illustrated embodiment of the suspension control system 101b, the controller 130 receives input from the cab accelerometer 340 and the position sensor 318 at both of the two front mount cab mount locations 107a, b, and both of the rear cab mount locations 109a, b. The controller 130 processes this input in real time and outputs corresponding command signals to the controllable suspension components (e.g., the damper 116 and/or the air spring 114) at each of the front and rear cab mount locations to improve the ride, road-holding or a combination of the two for the vehicle 100b and/or the cab 102. As those of ordinary skill in the art will appreciate, the control systems described herein can comprise feedback loops that take the system output from the various sensors into consideration, and enable the system to adjust the performance of the controllable suspension components to attenuate or otherwise reduce undesirable ride or road-holding characteristics.

Figure 5:
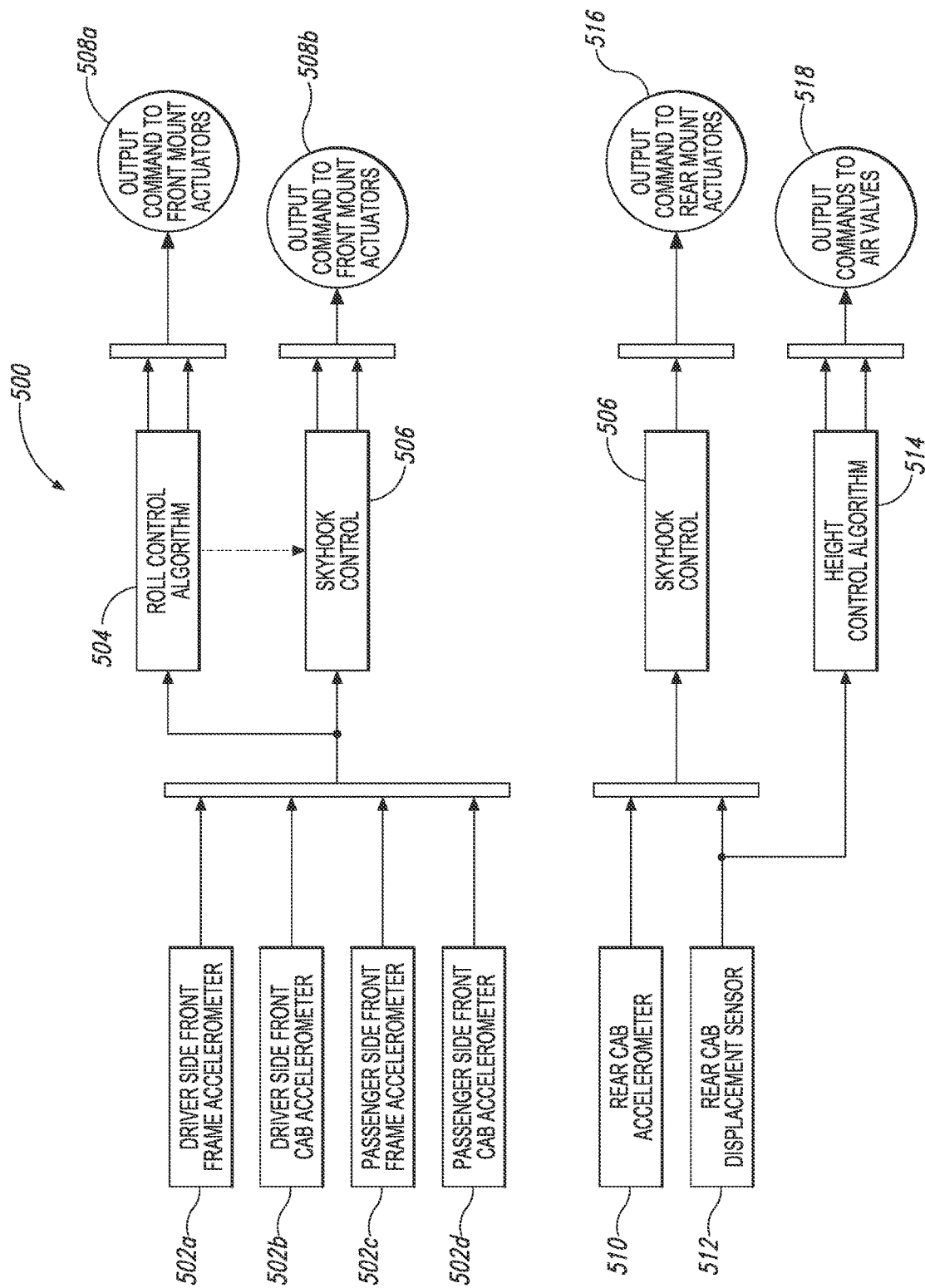
FIG. 5 is a logic diagram of a cab suspension control system configured in accordance with an embodiment of the present technology.

FIG. 5 illustrates a logic diagram 500 for the suspension control system 101a described in detail above with reference to FIGS. 1A and 2-4A. The upper portion of the diagram 500 pertains to control of the front cab mount locations 106a, b, and the lower portion of the diagram 500 pertains to control of the rear cab mount location 108. With respect to the front mount locations 106a, b, at blocks 502a-502d output from the driver side frame accelerometer 240b and the driver side cab accelerometer 240a (FIG. 2), and output from the corresponding passenger side frame accelerometer and the passenger side cab accelerometer, respectively, are provided to the controller 130 for execution of a roll control algorithm 504 and a skyhook control algorithm 506. As described in greater detail below with reference to, e.g., FIG. 7, based on the output from the front cab and frame accelerometers, the roll control algorithm 504 determines if the magnitude of the cab roll to one side or the other exceeds a preset threshold. If so, the roll control algorithm 504 outputs command signals to the two front isolators 112a, b to attenuate the roll as shown in block 508a. If not, the roll control algorithm 504 does not output command signals to the front isolators 112a, b, and instead defers to the skyhook control algorithm 506. As described in detail below with reference to, e.g., FIG. 6, based on the output from the front cab and frame accelerometers, the skyhook control algorithm 506 determines the appropriate output commands for the front isolators 112a, b to provide a desired level of damping, as shown in block 508b. In some embodiments, the skyhook control algorithm 506 attempts to control the suspension components so that the cab maintains a stable ride in accordance with conventional skyhook theory. In other embodiments, the skyhook control algorithm 506 can incorporate various other ride control algorithms known in the art to reduce ride vibration, shocks, etc.

Turning next to the rear cab mount location, at block 510 output from the rear cab accelerometer 340 (FIG. 3) is provided to the controller 130 for execution of the skyhook control algorithm 506, and at block 512 output from the rear cab position sensor 318 is provided to the controller 130 for execution of the skyhook control algorithm 506 and a height control algorithm 514. As described in detail below with reference to, for example, FIG. 6, based on the output from the rear cab accelerometer 340 and the rear cab position sensor 318, the skyhook control algorithm 506 determines the appropriate output command to vary the damping of the rear mount shock absorber 116 and provide the desired ride quality, as shown in block 516. As described in detail below with reference to, for example, FIG. 8, based on the input from the rear cab position sensor 318, the height control algorithm 514 determines whether the height of the air spring 114 should be adjusted. If so, the height control algorithm 514 can output an appropriate command to the air valve 350 (FIG. 3) to raise or lower the air spring 114 as necessary, as shown in block 518.

Figure 6:
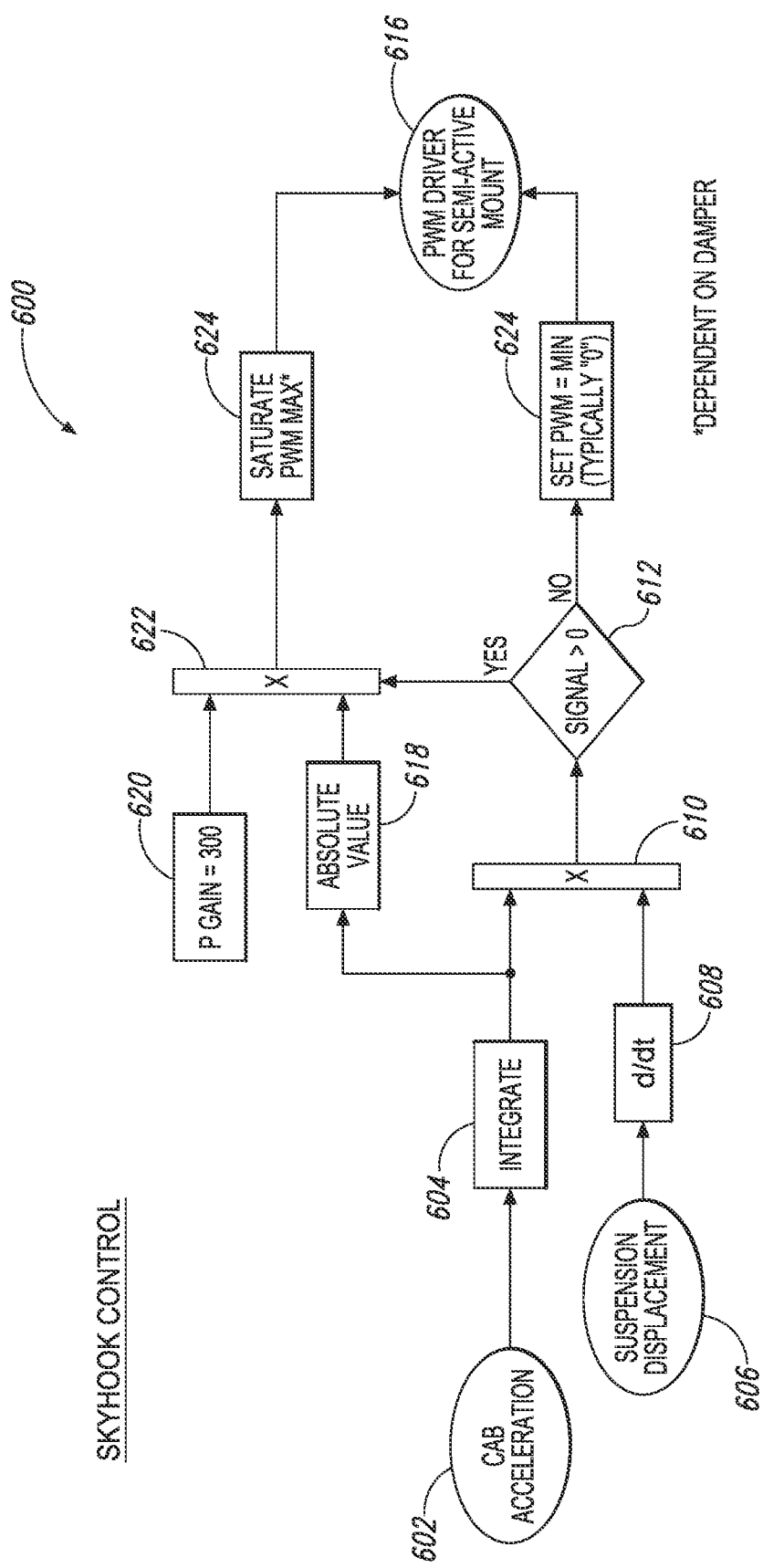
FIG. 6 is a flow diagram of a routine for controlling cab damping in accordance with an embodiment of the present technology.

FIG. 6 is a flow diagram of a routine 600 (e.g., a skyhook control algorithm) for controlling one or more semi-active suspension components in accordance with embodiments of the present technology. The routine 600 can be implemented by the controller 130 in accordance with computer-readable instructions to provide real-time command signals to one or more semi-active suspension components (e.g., the isolators 112 and/or the shock absorbers 116) based on acceleration and/or displacement input from one or more cab mount locations or other locations on the cab 102 and/or on the chassis 120. By way of example, the routine 600 will be described in the context of the rear cab mount location 108 described above with reference to FIGS. 1A and 3, with the understanding that the routine can also be implemented at either of the front isolator mount locations 106a, b of FIG. 1A, or at any of the front or rear cab mount locations 107a, b and 109a, b, respectively, of FIG. 1B.

The routine 600 begins at blocks 602 and 606 by receiving cab acceleration data and suspension displacement data, respectively. By way of example, the cab acceleration data can come from the cab accelerometer 340 shown in FIG. 3, and the suspension displacement data can come from the position sensor 318 also shown in FIG. 3. In block 604, the routine integrates the cab acceleration data to determine a cab velocity. In this embodiment, the cab velocity will be positive when the cab is moving upward relative to the road surface, and negative when the cab is moving downward relative to road surface. In block 608 the routine differentiates the suspension displacement data to determine the velocity of the suspension. In this embodiment, the suspension velocity will be positive when the suspension is expanding (also known as rebound); that is, when the cab is moving away from the chassis. Correspondingly, the suspension velocity will be negative when the suspension is compressing and the cab is moving toward the chassis. In block 610, the cab velocity is multiplied by the suspension velocity and the product is provided to decision block 612 as a criteria signal.

In decision block 612, the routine determines if the signal is greater than zero (i.e., whether the signal is positive or negative). If the signal is less than zero (i.e., the signal is negative), this indicates that damping between the cab 102 and the chassis 120 should be decreased to best approximate a theoretical skyhook damper, as is well known to those of ordinary skill in the art, and the routine 600 proceeds to block 614. In block 614, the pulse-width modulated signal that controls the voltage output to the semi-active suspension component (e.g., the shock absorber 116) is set to a minimum value (typically zero) corresponding to the minimum damping state of the component, and this control signal is sent to the semi-active component driver at block 616.

Returning to decision block 612, if the criteria signal is greater than zero (i.e., the signal is positive) this indicates that ride comfort would be improved by increasing the damping provided by the semi-active suspension component, and the routine proceeds to block 622. At block 622 the absolute value of the cab velocity (block 618) is multiplied by a proportional gain (block 620), e.g., a proportional gain of 300, and the product is provided to block 624. In block 624, the pulse-width modulated signal that controls the voltage output to the semi-active suspension component (e.g., the shock absorber 116) is varied in proportion to the absolute value of the cab velocity up to a maximum setting that is dependent on a particular suspension component. For example, if the cab velocity is relatively high at block 624, the routine increases the voltage output to the semi-active suspension component so that the damping is set at a maximum value. If the suspension component is a shock absorber having an electronically variable fluid orifice between adjacent fluid chambers, the voltage signal would be set at a maximum value to reduce the orifice size to the minimum value and thereby maximize the damping effect. If instead the suspension component included an MR fluid or an MR or ER elastomer, the voltage signal would be increased to achieve the highest damping possible from the MR or ER elastomer.

Figure 7:
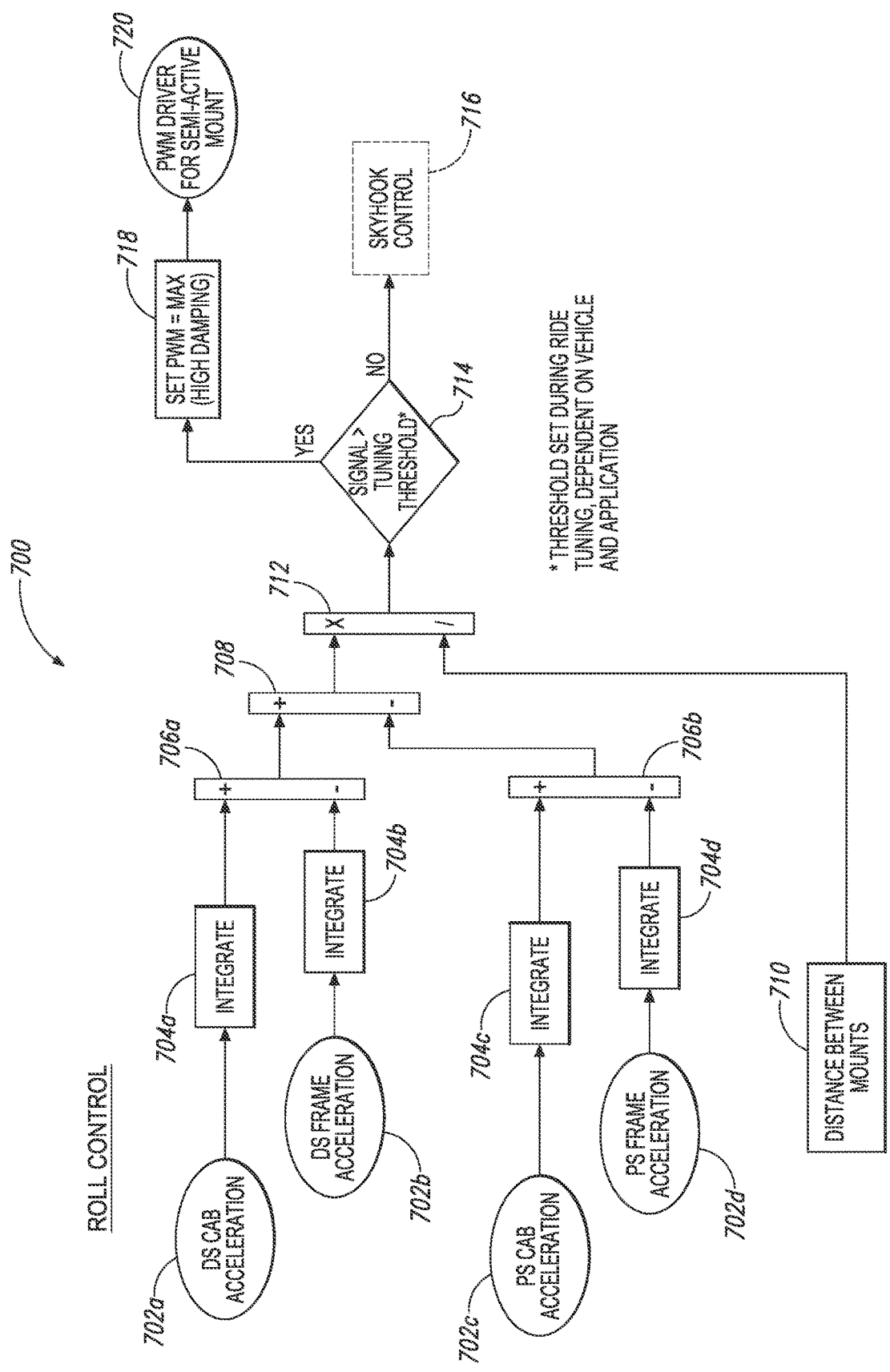
FIG. 7 is a flow diagram of a routine for controlling cab roll in accordance with the present technology.

FIG. 7 is a flow diagram of a routine 700 for controlling roll (e.g., lateral roll) of a vehicle cab (e.g., the cab 102) relative to a vehicle chassis (e.g., the chassis 120) in accordance with an embodiment of the present technology. In some embodiments, the routine 700 and/or portions thereof can be executed by the controller 130 in accordance with instructions stored on non-transitory computer-readable medium. By way of example, the routine 700 will be described in the context of the suspension control system 101a described in detail above with reference to FIGS. 1A, 2 and 4A. In other embodiments, however, those of ordinary skill in the art will appreciate that the routine 700 can be similarly applied to other cab mounting systems in accordance with the present disclosure. In block 702a, output from the driver side cab accelerometer 240a (FIG. 2) is provided to block 704a. In block 704a, the driver side cab acceleration is integrated and the resulting velocity is provided to block 706a. Similarly, at block 702b output from the driver side frame accelerometer 240b is provided to block 704b. In block 704b, the driver side frame acceleration is integrated, and the resulting velocity is also provided to block 706a. In block 706a, the frame velocity is subtracted from the cab velocity, and the result is provided to block 708. By way of example, if the frame is moving upward (positive velocity) and the cab is moving downward (negative velocity), the result of block 706a would be a net negative velocity associated with the driver side of the cab.

A similar velocity is also determined for the passenger side of the cab. More specifically, at block 702c output from the passenger side cab accelerometer is provided to block 704c, where it is integrated to determine a passenger side cab velocity that is provided to block 706b. At block 702d, output from the passenger side frame accelerometer is provided to block 704d, where it is also integrated to determine a passenger side frame velocity which in turn is also provided to block 706b. In block 706b, the passenger side frame velocity is subtracted from the passenger side cab velocity as described above for block 706a, and the result is provided to block 708. In block 708, the suspension velocities across the front cab mount locations 106a, b (which are located at the same, or at least approximately the same longitudinal position along the vehicle frame), are combined. More specifically, the passenger side mount velocity from block 706b is subtracted from the driver side mount velocity from block 706a. By way of example, if the driver side of the cab 102 is moving away from the driver side frame rail (resulting in a positive velocity from block 706a), and the passenger side of the cab 102 is moving toward the passenger side frame rail (resulting in a negative velocity from block 706b), then the result of block 708 would be a positive velocity indicating at least some magnitude of roll of the vehicle cab about the longitudinal axis of the vehicle toward the passenger side.

n block 710, the distance (in, e.g., feet/inches) between the driver side and passenger side cab mount locations 106a and 106b (FIG. 1A) is provided to block 712 along with the suspension velocity (in, e.g., feet per second) from block 708. In block 712, the suspension velocity is divided by the lateral distance between the cab mount locations to provide an indication of the magnitude of the roll motion (e.g., an angular velocity) to decision block 714. In decision block 714, the routine 700 determines if the criteria signal from block 712 is greater than a threshold tuning value. In some embodiments, the threshold tuning value of roll (e.g., an angular velocity) can be determined during vehicle ride tuning, and can be dependent on the particular vehicle and/or the particular vehicle application. If the signal is not greater than the tuning threshold, the routine proceeds to block 716 and reverts to the skyhook control algorithm described above with reference to FIG. 6 to determine the command signals for the suspension components. In the illustrated embodiment, however, if the roll signal is greater than the tuning threshold, the routine 700 proceeds to block 718 and sets the pulse-width modulated signal that controls the voltage output to the suspension components to the maximum value (e.g., the value resulting in the highest level of damping), and provides this control signal to the suspension component driver as indicated by block 720. For example, if the cab 102 is supported by the semi-active isolators 112 at each of the two front mount locations 106a, b as described above with reference to FIG. 1A, at block 720 the driver increases the damping provided by the isolators to the highest level to control the amount of roll the cab 102 is experiencing.

Figure 8:
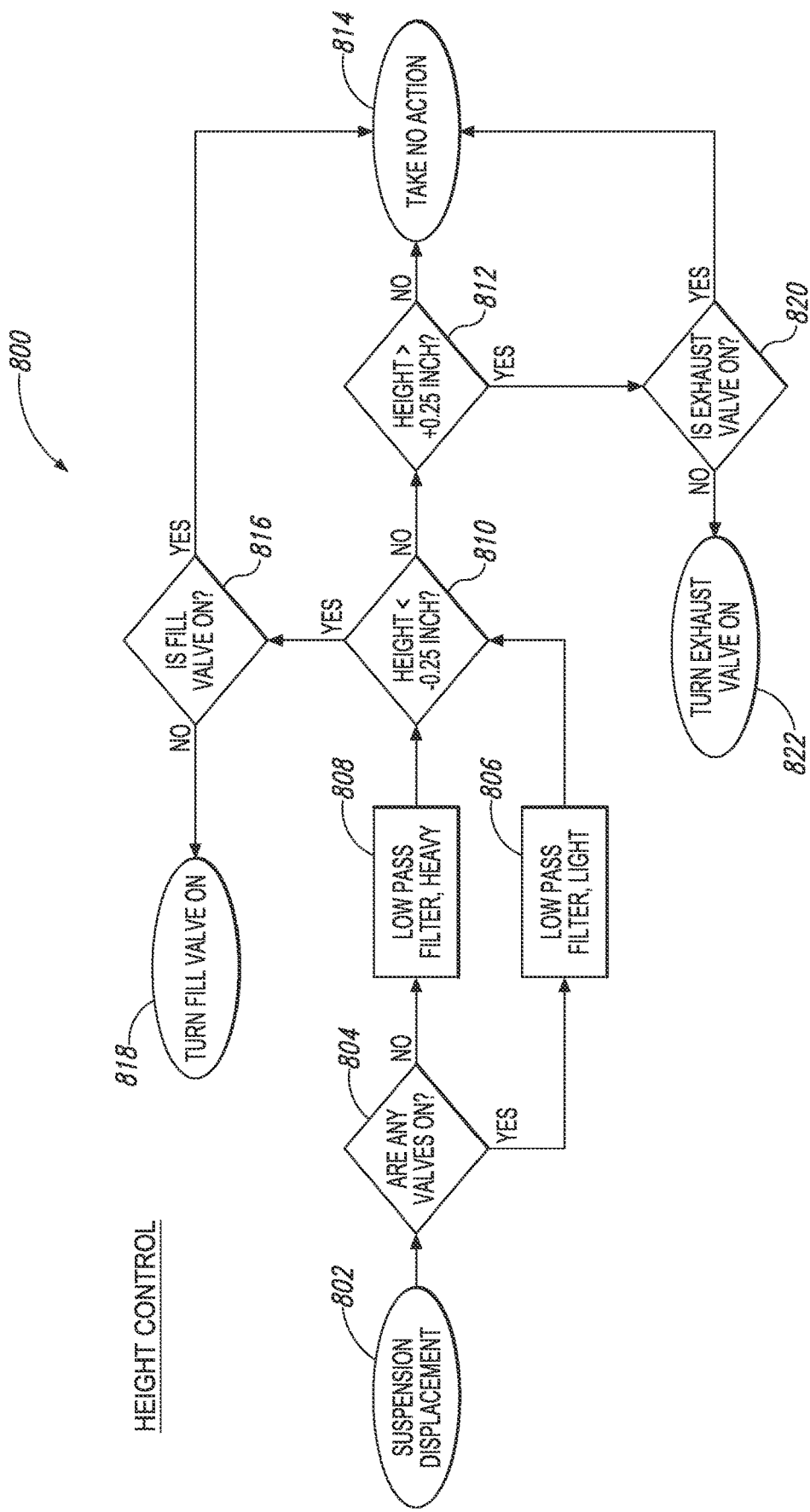
FIG. 8 is a flow diagram of a routine for controlling cab height in accordance with an embodiment of the present technology.

FIG. 8 is a flow diagram of a routine 800 for controlling cab height in accordance with an embodiment of the present technology. The routine 800 can be implemented by the controller 130 in accordance with instructions stored on computer-readable medium. By way of example, the routine 800 is described below in the context of the suspension components used at the cab rear mount location 108 as described above with reference to FIGS. 1A, 3 and 4A. As those of ordinary skill in the art will appreciate, however, the routine 800 can be utilized at virtually any cab mounting location having, for example, an air spring or other controllable suspension component with which the cab height can be varied. For example, the routine 800 can also be employed at one or more of the front mount locations 107a, b and/or the rear mount locations 109a, b described in detail above with reference to FIG. 1B and FIG. 4B.

Starting in block 802, suspension displacement at the cab mount location is provided to decision block 804. By way of example, in one embodiment the position sensor 318 described above with reference to FIG. 3 can provide data indicative of the displacement of the cab 102 relative to the frame 120 to the controller 130. In decision block 804, the routine determines if any of the valves for any of cab suspension air springs have been actuated. For example, in the context of FIG. 3, the routine determines if the valve 350 for the air spring 114 has been activated to either introduce high pressure into the air spring 114 and increase the ride height, or let air out of the air spring 114 and reduce the ride height. If the valve 350 is "on" so that the air spring 114 is either filling (extending) or exhausting (compressing) to adjust the ride height, the routine 800 proceeds to block 806. In block 806, the output signal from the position sensor 318 is lightly filtered so that relatively small changes in the suspension height resulting from air being added to or removed air from the air spring 114 can be readily detected. This enables the routine to respond quickly and turn the valve 350 "off" as soon as the signal indicates that the desired ride height has been achieved. In the foregoing manner, the lighter filter prevents overshooting a desired suspension position, while still eliminating responses to high frequency suspension oscillations. In one embodiment, the output signal from the displacement sensor can be lightly filtered by setting the cutoff frequency to a relatively high value.

Returning to decision block 804, if the valve 350 is "off" such that the air spring 114 is neither filling nor exhausting, the routing proceeds to block 808 and heavily filters the output signal from the position sensor 318 before providing it to decision block 810. In some embodiments, the position signal is heavily filtered when the valve 350 is off to avoid unnecessary cycling the valve 350 on and off and wasting the compressed air used to fill the air spring 114 in response to very short term (e.g., high frequency) signal inputs corresponding to minor vibrations or changes in position of the suspension. Instead, when the valve 350 is off, the routine only detects changes in the average long term position of the suspension, and not momentary suspension oscillations, and then provides this information to decision block 810.

Regardless of whether decision block 810 receives the suspension displacement signal from block 808 or block 806, in decision block 810 the routine determines whether the cab height is less than a preset distance below the suspension "design height" or "ride height." By way of example, if the preset distance was set at –0.25 inch and the cab was sitting 0.35 inch below the desired ride height relative to the vehicle frame, this would constitute a height that was less than –0.25 inch in decision block 810. If the height in decision block 810 is less than –0.25 inch, then the routine proceeds to decision block 816 to determine if the valve 350 is set to the fill position so that compressed air is flowing into the air spring 114 to raise the cab 102. If not, the routine proceeds to block 818 and turns the valve 350 to the fill position. Conversely, if the valve 350 is already in the fill position, the routine proceeds to block 814 and does not send any control signals to the valve 350. Returning to decision block 810, if the cab height is not less than –0.25 inch, the routine proceeds to decision block 812 and determines if the height is greater than +0.25 inch. If not, the routine proceeds to block 814 and takes no action. Conversely, if the cab height is greater than +0.25 inch, then the routine proceeds to decision block 820 to determine if the valve 350 is in the "exhaust" position such that compressed air is flowing out of the air spring 114 to reduce the cab height. If the valve 350 is in the "exhaust" position, the routine proceeds to block 814 and takes no action (e.g., the routine does not send any control signals to the valve 350). Conversely, if the valve 350 is not in the "exhaust" position, the routine proceeds to block 822 and sends a control signal to the valve 350 causing the valve 350 to turn to the "exhaust" position so that compressed air can flow out of the air spring 114 and reduce the ride height of the cab.

FIGS. 6-8 are representative flow diagrams that depict processes used in some embodiments. These flow diagrams do not show all functions or exchanges of data, but instead they provide an understanding of commands and data exchanged under the various embodiments of the suspension control systems disclosed herein. Those skilled in the relevant art will recognize that some functions or exchange of commands and data may be repeated, varied, omitted, or supplemented, and other (less important) aspects not shown may be readily implemented. In general, each of the steps depicted in the flow diagrams are of a type well known in the art, and can itself include a sequence of operations that need not be described herein. Those of ordinary skill in the art can create source code, microcode, program logic arrays, etc. for programming the controller 130 or otherwise implementing the disclosed embodiments based on the routines and detailed description provided herein.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

Figure 9:
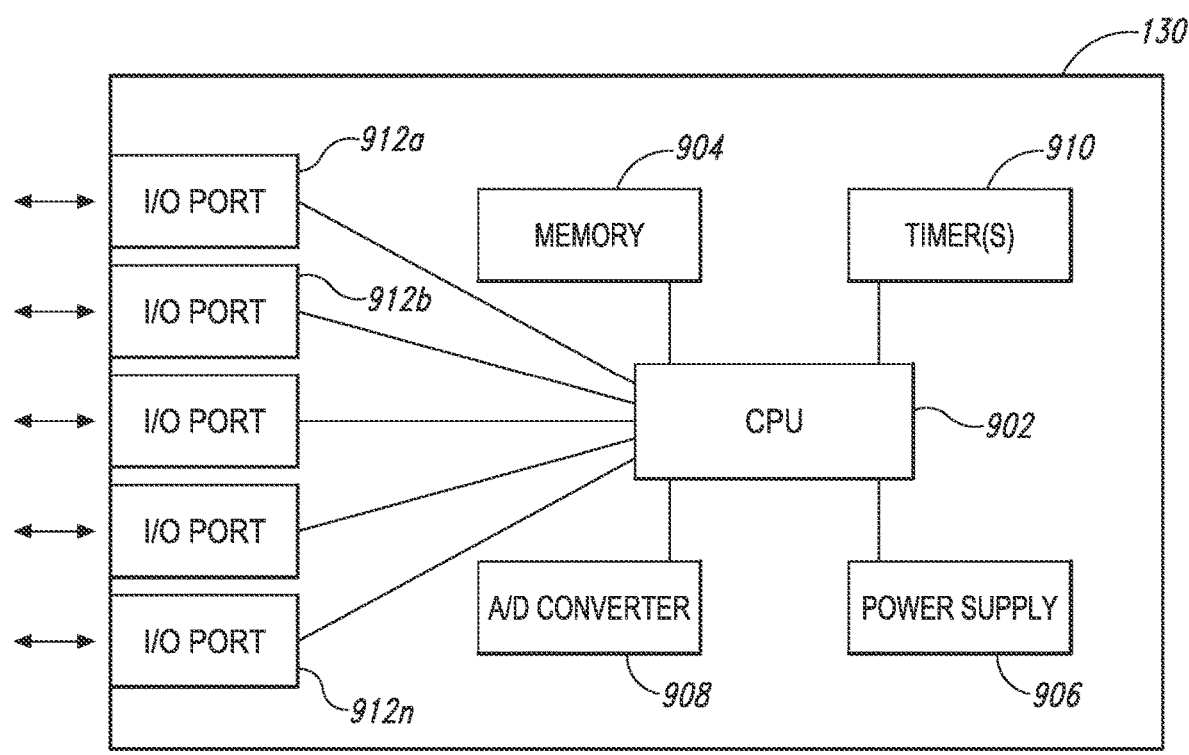
FIG. 9 is a block diagram of a controller for use with cab suspension systems configured in accordance with the present technology.

FIG. 9 is a schematic diagram of the controller 130 configured in accordance with an embodiment of the present technology. In the illustrated embodiment, the controller 130 includes at least one processor 902 (e.g., a CPU) that receives power from a power supply 906. The power supply 906 can include, for example, a dedicated battery or power from the vehicle power system. The controller 130 additionally includes a plurality of input/output ports 912 (identified individually as I/O ports 912a-n) for receiving input from the various sensors described in detail above (e.g., the accelerometers 240, 340 and the position sensor 318), and providing command signals to the various suspension components (e.g., the semi-active isolators 112, the semi-active shock absorber 116 and the air spring 114). Additionally, the controller 130 can include an analog-to-digital converter 908 to convert analog signals, such as analog voltage or current signals from the sensors described above to digital information for the processor 902. The processor 902 can execute the routines described in detail above with reference to FIGS. 5-8 in accordance with non-transitory instructions stored on computer-readable medium, such as non-volatile memory 904, or stored on removable media, hardwired or preprogrammed in chips, such as EEPROM semiconductor chips. As those of ordinary skill in the art will appreciate, the controller 130 can include various other components as necessary to implement the routines described herein, including, for example, one or more timers 910, as well as other electronic components well known in the art.

Although not required, aspects of the invention are described in the general context of computer-executable instructions, such as routines executed by a general-purpose data processing device, e.g., a CPU. Those skilled in the relevant art will appreciate that aspects of the invention can be practiced with other data processing or computer system configurations, including multi-processor systems, microprocessor-based or programmable electronics, Programmable Logic Controllers (PLCs), Peripheral Interface Controllers (PICs), and the like. Indeed, the terms computer, controller, and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a CAN system. Although specific circuitry is described above, those or ordinary skill in the art will recognize that a microprocessor-based system could also be used where any logical decisions are configured in software.

Figure 10B:
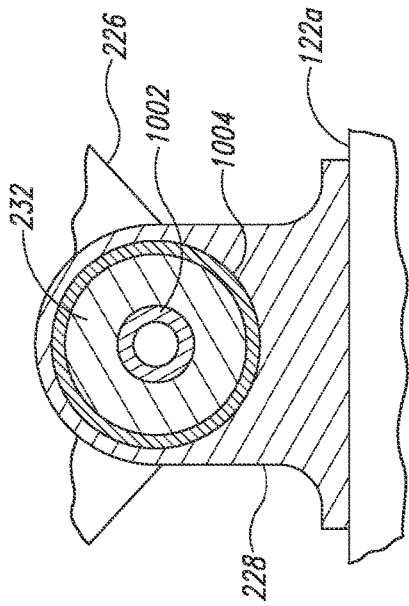
FIGS. 10A and 10B are front and side cross-sectional views, respectively, of a semi-active isolator configured in accordance with an embodiment of the present technology.
Figure 10A:
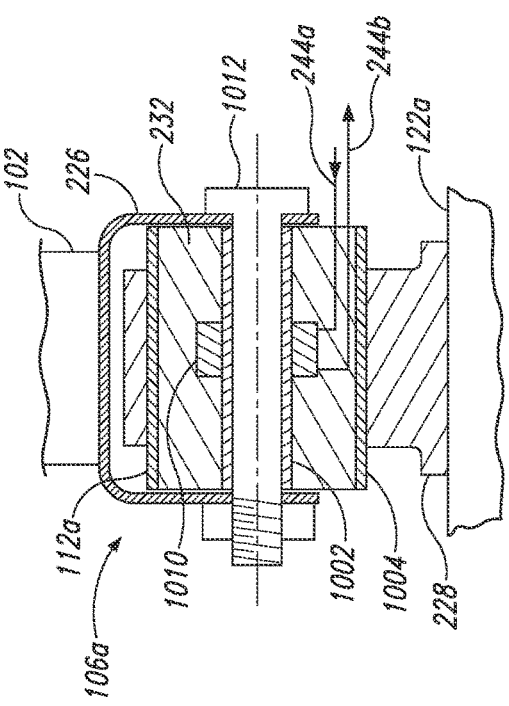

FIGS. 10A and 10B are front and side cross-sectional views, respectively, of the isolator 112a (FIG. 2) configured in accordance with an embodiment of the present technology. Referring first to FIG. 10A, in the illustrated embodiment the isolator 112a includes a metal inner sleeve 1002 concentrically arranged inside of a metal outer sleeve 1004. The annular body 232 of the isolator 112 is sandwiched between the inner sleeve 1002 and the outer sleeve 1004. In the illustrated embodiment, the cab 102 is mounted to the frame rail 122a by a bolt 1012 that extends through the cab mounting bracket 226 and the inner sleeve 1002. The outer sleeve 1004 is securely mounted to the isolator base 228, which is in turn attached to the frame rail 122a via bolts or other suitable attachment means. In the foregoing manner, the annular body 232 of the isolator 112a can transmit the static loads and isolate the dynamic loads between the cab 102 and the frame rail 122a at the front mount location 106a.

As noted above with reference to FIG. 2, in some embodiments the annular body 232 can be made from an MR elastomer. In operation, the damping properties of the MR elastomer can be increased to dampen vibrations between the frame 122 and the cab 102 by applying current to an electromagnet 1010 positioned around or at least proximate the inner sleeve 1002 to increase the magnetic field applied to the MR elastomer. In other embodiments, the annular body 232 can include one or more internal chambers that contain an MR fluid, and the damping properties of the isolator 112a can be varied by changing the magnetic field applied to the fluid. In further embodiments, the annular body 232 can be made from an ER elastomer in which the damping properties of the isolator 112a can be varied dynamically by changing the electric field applied to the ER elastomer.

Figure 11:
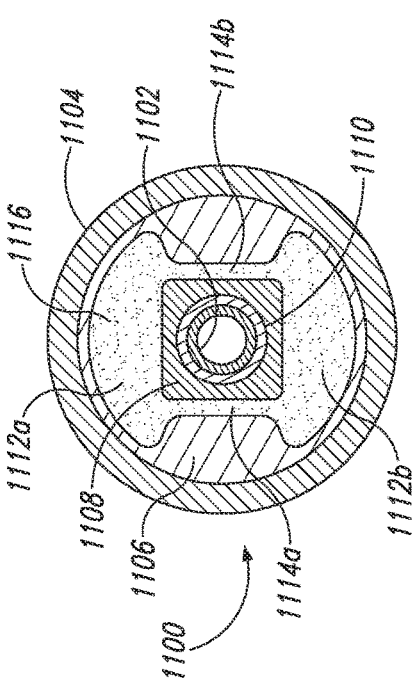
FIG. 11 is a side cross-sectional view of a semi-active isolator configured in accordance with another embodiment of the present technology.

FIG. 11 is a side cross-sectional view of an isolator 1100 configured in accordance with another embodiment of the present technology. In the illustrated embodiment, the isolator 1100 includes a metal inner sleeve 1102 positioned within a metal outer sleeve 1104. An outer liner 1106 is disposed against the inner surface of the outer sleeve 1104, and an inner liner 1108 is disposed around the outer surface of the inner sleeve 1102. In the illustrated embodiment, the outer and inner liners 1106 and 1108 can be made from natural rubber or other elastomers. The outer liner 1106 defines an upper chamber 1112a that is in fluid communication with a lower chamber 1112b by means of passages 1114a, b on opposite sides of the inner liner 1108. In this embodiment, the inner liner 1108 has a generally rectangular or square shape so that the passages 1114a, b are generally straight with parallel sidewalls. The volume between outer liner 1106 and the inner liner 1108 can be filled with fluid 1116. Although not shown in FIG. 11, the isolator 1100 can include an end cap on each end to contain the fluid 1116 within the inner volume and give the isolator 1100 a generally cylindrical shape.

The isolator 1100 can be installed between the cab 102 and the frame rail 122a in generally the same manner as the isolator 112a described above with reference to FIGS. 10A and 10B. For example, a bolt (not shown in FIG. 11) extending through the inner sleeve 1102 can couple the isolator 1100 to a cab mounting bracket, and the outer sleeve 1104 can be held in a base (also not shown) that is mounted to the frame rail 122a. In operation, vertical movement of the cab 102 relative to the frame 122a causes the inner sleeve 1102 and the inner lining 1108 to move toward the corresponding chamber 1112a or 1112b, thereby driving the fluid 1116 from the chamber and into the other chamber through the channels 114. In the process, the viscosity of the fluid 1116 flowing between upper and lower chambers 1112a, b tends to dampen out the vertical motion. In other embodiments, the fluid 1116 can be an MR fluid, and the damping can be increased if desired by applying current to an electromagnet 1110 which, in the illustrated embodiment, is positioned around the inner sleeve 1102.

Figure 12:
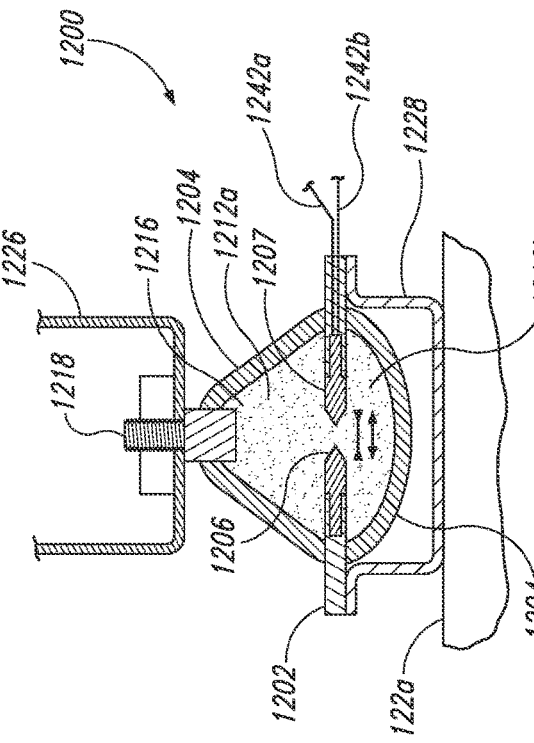
FIG. 12 is a front cross-sectional view of a semi-active isolator configured in accordance with a further embodiment of the present technology.

FIG. 12 is a front cross-sectional view of an isolator 1200 configured in accordance with another embodiment of the present technology. In the illustrated embodiment, the isolator 1200 includes thick walls 1204 of elastomeric material (e.g., rubber) that define a generally conical upper chamber 1212a and a generally hemispherical lower chamber 1212b. A mounting plate 1202 is fixedly attached between the upper chamber 1212a and the lower chamber 1212b, and is attached to a frame mounting bracket 1228 with bolts or other suitable fasteners. In the illustrated embodiment, the walls 1204 define a body of revolution that is symmetrical about a vertical axis. In another aspect of this embodiment, a threaded stud 1218 or other attachment feature is fixedly attached to the upper portion of the walls 1204, and is configured to receive an upper bracket 1226 that is attached to the cab 102.

In some embodiments, the upper and lower chambers 1212a, b can be filled with a compressible fluid 1216, such as a silicone-based fluid. Motion of the frame 122a relative to the cab 102 compresses the fluid 1216 resulting in a spring rate. Relative motion of the suspension also causes restricted flow of the fluid 1216 through an orifice 1206 that separates the upper chamber 1212a from the lower chamber 1212b, thereby providing damping. In some embodiments, the isolator 1200 can include an electrically controlled semi-active valve 1207 that receives control inputs via electrical leads 1242*a, b* (e.g., wires). The valve 1207 can vary the size of the orifice 1206 to provide a desired level of damping in response to the various types of sensor inputs described in detail above. In other embodiments, the fluid 1216 can be an MR fluid, and the elastomeric walls 1204 can provide the desired spring rate of the isolator 1200. Additionally, in this embodiment, the orifice 1206 can be a fixed size, but the damping can be changed in response to control inputs by varying the current applied to an electromagnet (not shown) that can be mounted to, for example, the plate 1202 around or proximate the orifice 1206 to thereby increase the viscosity of the MR fluid.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology. The teachings of the invention provided herein can also be applied to other systems, not necessarily the systems described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A commercial vehicle comprising:
a cab configured to support an operator of the vehicle;
a chassis;
a semi-active suspension component operably coupling a front portion of the cab to the chassis;
a passive suspension component operably coupling a rear portion of the cab to the chassis;
a first sensor operably coupled to the cab and configured to sense an acceleration of the cab;
a second sensor operably coupled to the chassis and configured to sense an acceleration of the chassis; and
a controller operably connected to the semi-active suspension component and the first and second sensors, wherein the first sensor is configured to provide an input signal to the controller related to the acceleration of the cab, wherein the second sensor is configured to provide an input signal to the controller related to the acceleration of the chassis, and wherein the controller is configured to change a damping characteristic of the semi-active suspension system component based at least in part on the acceleration of the cab and the acceleration of the chassis.

2. The commercial vehicle of claim 1, wherein:
the semi-active suspension component is a first semi-active suspension component that operably couples a first front corner portion of the cab to the chassis,
the vehicle further comprises a second semi-active suspension component operably coupling a second front corner portion of the cab to the chassis, and
the controller is operably connected to the first and second semi-active suspension components and configured to change damping characteristics of at least one of the first and second semi-active suspension components based at least in part on the acceleration of the cab and the acceleration of the chassis.

3. The commercial vehicle of claim 1, wherein:
the semi-active suspension component is a first semi-active suspension component that operably couples a first front corner portion of the cab to the chassis, the passive suspension component is a first passive suspension component that operably couples a first rear corner portion of the cab to the chassis, the vehicle further comprises—
- a second semi-active suspension component operably coupling a second front corner portion of the cab to the chassis,
- a second passive suspension component operably coupling a second rear corner portion of the cab to the chassis, and the controller is operably connected to the first and second semi-active suspension components and configured to change damping characteristics of at least one of the first and second semi-active suspension components based at least in part on the acceleration of the cab and the acceleration of the chassis.

4. The commercial vehicle of claim 1, wherein:
the semi-active suspension component is a first semi-active vibration isolator operably coupling a first front corner portion of the cab to the chassis,
the passive suspension component is a telescoping shock absorber operably coupling the rear portion of the cab to the chassis,
the vehicle further comprises a second semi-active vibration isolator operably coupling a second front corner portion of the cab to the chassis, and
the controller is operably connected to the first and second semi-active vibration isolators and configured to change damping characteristics of the first and second semi-active vibration isolators based at least in part on the acceleration of the cab and the acceleration of the chassis.

5. The commercial vehicle of claim 1, wherein:
the damping characteristic of the semi-active suspension component is changed based at least in part on a difference in velocity between the cab and the chassis, and
the velocity of the cab is determined by integrating the acceleration of the cab and the velocity of the chassis is determined by integrating the acceleration of the chassis.

6. The commercial vehicle of claim 1, wherein:
the vehicle further comprises:
- an air spring operably coupled between the rear portion of the cab and the chassis; and
- a position sensor configured to determine a vertical displacement of the cab relative to the chassis, and the controller is operably connected to the air spring and further configured to change the height of the air spring based at least in part on the vertical displacement of the cab relative to the chassis.

7. The commercial vehicle of claim 1, wherein the semi-active suspension component includes an annular bushing having a bore extending perpendicular to a longitudinal axis of the vehicle, and wherein the front portion of the cab is operably coupled to the chassis by a pin that extends through the bore.

8. The commercial vehicle of claim 1, wherein:
the commercial vehicle is a heavy duty vehicle having a hood positioned over an engine compartment forward of the cab,
the hood is mounted to the chassis independently of the cab,
the semi-active suspension component includes an annular bushing having a bore extending perpendicular to a longitudinal axis of the vehicle, and
the front portion of the cab is operably coupled to the chassis by a pin that extends through the bore.

9. The commercial vehicle of claim 1, wherein:
the semi-active suspension component is a semi-active telescoping shock absorber, and
the passive suspension component is a passive telescoping shock absorber.

10. The commercial vehicle of claim 1, wherein:
the semi-active suspension component is a semi-active telescoping shock absorber,
the passive suspension component is a first passive telescoping shock absorber,
the commercial vehicle further comprises:
- a first air spring operably coupled between the front portion of the cab and the chassis proximate the semi-active telescoping shock absorber;
- a second air spring operably coupled between the rear portion of the cab and the chassis proximate the passive telescoping shock absorber; and
- a position sensor configured to determine a vertical displacement of the cab relative to the chassis, and the controller is operably connected to the first and second air springs and is further configured to change the height of the first and second air springs based at least in part on the vertical displacement of the cab relative to the chassis.

11. The commercial vehicle of claim 1, wherein:
the semi-active suspension component is a semi-active vibration isolator, and
the instructions, when executed by the controller, cause the controller to respond to the first and second input signals by changing a damping characteristic of the semi-active vibration isolator.

12. The commercial vehicle of claim 1, wherein:
the first sensor is a first accelerometer and the second sensor is a second accelerometer,
the instructions, when executed by the controller, cause the controller to determine a rate of roll of the cab relative to the chassis based at least in part on the first and second input signals and, when the rate of roll exceeds a threshold value, increase damping of the semi-active suspension component.

13. The commercial vehicle of claim 1, wherein:
the suspension system further comprises a position sensor positioned to sense displacement of the cab relative to the chassis,
the position sensor is configured to provide a third input signal to the controller related to the displacement of the cab relative to the chassis, and
the instructions, when executed by the controller, cause the controller to respond to the first, second, and third input signals by changing an operating parameter of at the semi-active suspension component based at least in part on the acceleration of one of the cab or chassis, and the displacement of the cab.

14. The commercial vehicle of claim 1, wherein:
the suspension system further comprises a position sensor positioned to sense displacement of the cab relative to the chassis,
the position sensor is configured to provide a third input signal to the controller related to the displacement of the cab relative to the chassis, and
the instructions, when executed by the controller, cause the controller to respond to the first and third input signals by (a) determining a cab velocity based at least in part on the acceleration of the cab, (b) determining a suspension velocity based at least on part on the displacement of the cab relative to the chassis, and (c) changing a damping characteristic of the semi-active suspension component based at least in part on a product of the cab velocity and the suspension velocity.

15. The commercial vehicle of claim 1, wherein:
the semi-active suspension component is a telescoping shock absorber,
the first sensor is proximate the telescoping shock absorber,
the suspension system further comprises a position sensor operably coupled to the chassis proximate the telescoping shock absorber,
the position sensor is configured to provide a third input signal to the controller related to the displacement of the cab relative to the chassis, and
the instructions, when executed by the controller, cause the controller to respond to the first and third input signals by (a) determining a cab velocity based at least in part on the acceleration of the cab, (b) determining a suspension velocity based at least on displacement of the cab, and (c) changing a damping characteristic of the telescoping shock absorber based at least in part on a product of the cab velocity and the suspension velocity.

16. A suspension system for mounting a vehicle cab to a vehicle chassis, the suspension system comprising:
a first semi-active suspension component operably positioned between a first front corner portion of the cab and the chassis;
a second semi-active suspension component operably positioned between a second front corner portion of the cab and the chassis;
a passive suspension component operably positioned between a rear portion of the cab and the chassis;
a first sensor positioned to sense an acceleration of the cab;
a second sensor positioned to sense displacement of the cab relative to the chassis; and
a controller configured to be operably connected to the first and second semi-active suspension components, the first sensor, and the second sensor, wherein—
the first sensor is configured to provide a first input signal to the controller related to the acceleration of the cab,
the second sensor is configured to provide a second input signal to the controller related to the displacement of the cab relative to the chassis, and
the controller includes at least one non-transitory computer readable medium storing instructions that, when executed by the controller, cause the controller to respond to the first and second input signals by (a) determining a cab velocity based at least in part on the acceleration of the cab, (b) determining a suspension velocity based at least on part on the displacement of the cab relative to the chassis, and (c) changing a damping characteristic of at least one of the first and second semi-active suspension components based at least in part on a product of the cab velocity and the suspension velocity.

17. The suspension system of claim 16, wherein the first and second semi-active suspension components are telescoping shock absorbers, and wherein the accelerometer is configured to sense the acceleration of the cab proximate one of the first and second semi-active suspension components.

18. The suspension system of claim 16, wherein the first semi-active suspension component is a semi-active vibration isolator, and wherein the instructions, when executed by the controller, cause the controller to respond to the first and second input signals by changing a damping characteristic of the semi-active vibration isolator.

* * * * *